A
United States Patent [19]
Marchisio et al.

[11] 3,865,723
[45] Feb. 11, 1975

[54] METHOD TO FORM STABLE COMPLEXES OF POLYANIONS OCCURRING IN BIOLOGICAL LIQUIDS

[75] Inventors: Maria Antonietta Marchisio; Paolo Ferruti; Tito Longo; Ferdinando Danusso, all of Milan, Italy

[73] Assignees: Zambon S.p.A., Bresso, Milan, Italy

[22] Filed: Mar. 21, 1973

[21] Appl. No.: 343,358

[30] Foreign Application Priority Data
Mar. 21, 1972 Italy .................................. 22152/72

[52] U.S. Cl......... 210/54, 210/DIG. 23, 260/112 B, 424/183, 210/58, 210/59
[51] Int. Cl.............................................. A61k 17/18
[58] Field of Search .... 210/59, 58, 52, 54, DIG. 23; 260/78 A, 80 P, 112 B; 424/183

[56] References Cited
UNITED STATES PATENTS

| | | | |
|---|---|---|---|
| 3,414,509 | 12/1968 | Bloch............................. | 260/78 A |
| 3,577,534 | 4/1971 | Teow Yan Koh................... | 424/183 |
| 3,635,909 | 1/1972 | Fujimoto et al. ................. | 260/78 A |
| 3,730,888 | 5/1973 | Buckman et al..................... | 210/52 |
| 3,766,104 | 10/1973 | Bonin et al. ........................ | 424/183 |
| 3,773,739 | 11/1973 | Bonvicini et al................. | 260/78 A |

OTHER PUBLICATIONS

Gubernieva, L. M., et al., "Reaction of Amino Acids with Heparin" Chem. Abstract, Vol. 71, (1969), 57410d.

*Primary Examiner*—Thomas G. Wyse
*Assistant Examiner*—Benoit Castel
*Attorney, Agent, or Firm*—Stevens, Davis, Miller & Mosher

[57] ABSTRACT

Polymers with polyamidic-aminic structure able to form complexes with polyanions occurring in biological liquids and process for their preparation.

A method to complex and thus neutralize or eliminate polyanions occurring in biological liquids is taught and apparatus to carry out this method is disclosed.

10 Claims, No Drawings

METHOD TO FORM STABLE COMPLEXES OF POLYANIONS OCCURRING IN BIOLOGICAL LIQUIDS

The present invention refers to a class of new products able to form stable complexes with polyanions occurring in biological liquids, as well as to the process for their preparation.

Moreover the invention refers to a new method for forming stable complexes and thus eliminating polyanions such as heparin from biological liquids such as blood.

More precisely the present invention relates to a method of using a new class of polymers which may be prepared in a linear, water-soluble form, so as to remain present in biological liquids as soluble non-toxic complexes with polyanions which do not alter the blood clotting mechanism, or in a cross-linked insoluble form so as to eliminate said polyanions from biological liquids by complexing the same on their solid surface suitably provided. The problem of neutralising or at least moderating the long term effects of particular substances introduced artifically or spontaneously existing in biological systems is well known and has long been the object of study and research. It is also known that many of these substances have the characteristics of polyanions.

A particularly important exemplifying case of situations of this type is the need to keep the coagulating property of blood under sufficiently exact control when substances are present in it which have an anticoagulating action, such as heparin or polysaccharide sulphonates.

Up to the present time in order to obtain this control, various substances have been used and are under experimentation, such as protamine sulphate and hydrochloride, polybrene, benzalcone chloride, toluidine blue and others, used as complexing agents in relation to heparin or other acid polysaccharides or mucopolysaccharides.

The protamine, which in the form of its sulphate is the only one of the aforementioned substances to have been currently used for that purpose, is a basic protein of extractive origin containing guanidinic groups derived from arginine, to which its activity in relation to heparin is attributed. The polybrene is a synthetic polymer containing quaternary ammoniacal groups.

The benzalcone chloride is a non-macromolecular compound, having the character of a quaternary ammonium salt. The toluidine blue is a basic non-macromolecular dye.

Of these, the protamine sulphate and polybrene act in solution, complexing the heparin and hence neutralising its anticoagulant capacity; however they give rise to disadvantages and in particular they are in themselves, if free, powerful anticoagulants. It follows that their use in neutralising heparin is not free from risks, because if they are administered by error in an excessive dosage in relation to the heparin which they are to complex, they act in the opposite manner to that desired, making the blood turn hypo or incoagulable. The toluidine blue, because of its toxicity, cannot evidently be used in the majority of cases. The benzalcone chloride is not used in solution, as in the previous cases, but only adsorbed on the surface of items which have to be placed in contact with the blood, and which are lined with graphite and benzalcone, are treated with an excess of heparin and hence, as the heparin is retained on the surface by the action of the benzalcone chloride which forms complexes with it, have an antithrombogenic action. The use of benzalcone chloride however gives rise to various disadvantages among which is the low stability of the heparin/benzalcone chloride/graphite/material system with time, and the hemolytic capacity of the benzalcone chloride.

The object of the present invention is to provide a material which interacts specifically and selectively with polyanions, in particular with heparin or other natural or artificial acid polysaccharides or mucopolysaccharides, of anticoagulant action, which forms stable complexes with them, while avoiding the aforementioned disadvantages and problems. The object of the invention has been obtained by employing a new class of polymers able to form stable complexes with polyaniones occurring in biological liquids nd characterized in and they comprise monomeric units derived from:

A. the group consisting of bis-acryl amides which are bis acryloyl-piperazines and aliphatic bis acryl amides of the formula

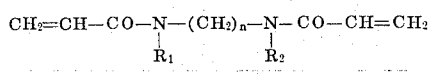

wherein
$n$ may be a number from 1 to 6 and $R_1$, $R_2$ equal or different between them, are H or alkyl radical with from 1 to 6 carbon atoms;

B. the group consisting of primary or secondary amines of the formula

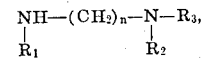

wherein
$n = 1$ to 6 and $R_1$, $R_2$, $R_3$ are H or alkyl with 1–6 carbon atoms, provided that only one of them is hydrogen and when $R_1 = CH_3$, $R_2$ is different from $CH_3$;

and possibly they also comprise monomeric units derived from:

C. the group consisting of carboxylic amino-acids which are piperazine mono- and di-carboxylic acids and aliphatic amino-acids of the formula
$H_2N-CH_2-(R)_n-COOH$, where $n$ may be 0 or 1 and R is a linear or branched aliphatic radical containing from 1 to 6 carbon atoms;

D. the group consisting of allyl-amine and aliphatic saturated amino-compounds containing from 2 to 12 carbon atoms and two primary amino group;

E. the group consisting of vinyl derivatives which are vinyl-pyrrolidone, N-acrylyl-morpholine and acrylamide.

The new polymers for carrying out the invention may be prepared under the form of linear copolymers which are soluble in the biological liquids or under the form of solid cross-linked copolymers, insoluble in the biological liquids.

More precisely if copolymers are prepared from monomeric units selected only in the groups A and B or in the groups A, B and C, linear copolymers are obtained, unable to cross-link and soluble in the biological liquids wherein they form soluble non-toxic stable complexes with the polyanions therein present.

If alternatively copolymers are prepared which in addition to containing monomeric units derived from the groups A, B and C, also contain monomeric units derived from the groups of monomers D and E, copolymers are obtained which are able to form under suitable conditions cross-linked solid products which do not dissolve in biological liquids. However, when suitably brought in contact with biological liquids they are able to eliminate the polyanions present by fixing said polyanions on their surface in the form of stable complexes. The linear water-soluble copolymers according to the invention are prepared by dissolving at least one monomer from the group A, at least one monomer from group B and possibly at least one monomer from group C in water or in a hydroxylated protic solvent, such as alcohols, and allowing them to polymerize at a temperature between 10° and 50°C for a time ranging from a few hours (3-4 hours) to some days (3-5 days).

A group of cross-linked water-insoluble copolymers for carrying out the invention are prepared by dissolving at least one monomer from the group A, at least one monomer from the group B and possibly at least one monomer from the group C, together with an amino-compound containing from 2 to 12 carbon atoms and two primary amino groups, in water or in a hydroxylated protic solvent, such as an alcohol.

The monomer mixture is allowed to polymerize at a temperature ranging from 10° to 50°C, for a time from a few hours (3-4 hours) to a few days (3-5 days) and the formed copolymer is separated.

Another group of cross-linked water-insoluble copolymers according to the invention are prepared by dissolving at least one monomer from the group A, at least one monomer from the group B and possibly at least one monomer from the group C together with allyl-amine, in water or in a hydroxylated protic solvent, such as an alcohol.

This monomer mixture is allowed to polymerize at a temperature between 10° and 50°C, for a time ranging from a few hours to a few days. The thus formed linear copolymer is allowed to cross-link through the allyl-amine units by submitting the same to radicalic polymerization conditions in the presence of suitable catalysts such as peroxides and azocompounds.

Another group of cross-linked water-insoluble copolymers according to the invention are prepared by dissolving at least one monomer from the group A, at least one monomer from group B, possibly at least one monomer from group C and allyl-amine, in water or in a hydroxylated protic solvent, such as an alcohol. The monomers mixture is allowed to polymerize at a temperature between 10° and 50°C, for a time ranging from a few hours to a few days.

The thus formed linear copolymer, still in solution, is added with at least one hydrophilic vinylic or vinylidenic monomer and allowed to cross-link under radicalic polymerization conditions in the presence of suitable catalysts, such as peroxides or azo-compounds.

The vinylic or vinylidenic monomer is preferably selected in the group consisting of vinyl-pyrrolidone, N-acrylyl morpholine and acrylamide. A further important object of the present invention is to provide a method for stably capturing natural or artificial polyanions to the desired extent, of the aforementioned type present in biological means, avoiding at the same time unfavourable side and secondary effects. A more particular object of the present invention is to provide a method for dosing the heparin content in a biological means, particularly blood, and controlling the degree of coagulability of the blood to the required level.

To attain these objects the present invention provides a method characterized in that the biological means having a pH of 3-10 containing the polyanion to be controlled or captured is brought into intimate contact with a capturing or complexing agent whose active principle is constituted of macromolecular chains, of the type heretofore defined, for the time necessary for the poly(amide-amine) constituting the active principle of the complexing agent to interact with the polyanion to be captured, in particular for a time of 1-600 seconds.

In a first preferred embodiment of the method according to the present invention the said intimate contact is established between the capturing agent in solid form, insoluble in biological liquids and having a high surface tension, and the biological liquid containing the polyanion, in particular heparin.

In a further embodiment of the method according to the present invention, particularly useful for neutralising polyanions, the capturing agent preferably in solution form is mixed with the biological liquid containing the polyanion to be neutralized, without the complex formed separating from the biological liquid.

The means used to carry out the invention consist of an apparatus comprising a flow circuit for said biological material in which the polyanion to be controlled or captured is present, in said circuit there being provided a zone of intimate contact between said biological means and a complexing or capturing, as defined above, of solid form and of high surface extension. In a first preferred embodiment said contact zone is formed by a tubular element, through which said biological means flows, said tubular element being filled with said complexing agent in subdivided solid form, preferably granular, retained within said tubular element by suitable perforated retention baffles.

In a further embodiment said contact is obtained by means of solid elements consisting of a solid support of large surface with respect to its volume, said solid support being covered with a film formed from said complexing or capturing agent.

In a further embodiment said contact is obtained by means of solid elements formed from a mixture consisting of the complexing agent and a solid which is inert under the conditions of use.

It has been surprisingly found that the polymers for carrying out the present invention have the capability of interacting with the anticoagulant agents of acid character in biological environments, without causing damaging side effect of the aforementioned type in relation to substances already known to the art. These polymers are hence particularly suitable for replacing in practice the already known agents, either in use or in the experimental laboratory stage, which are able to form complexes or otherwise interact with heparin or other acid polysaccharides or mucopolysaccharides. These in fact, in their linear from, if used in solution are able to neutralise the anticoagulant capacity of heparin dissolved in water or biological liquids. However they do not themselves have, as in the case of protamine or polybrene, high anticoagulant properties, as they do not interfere with the coagulation factors, and do not thus give rise to risks in the case of hyperdosage.

It is however also possible to obtain polymers of polyamide-amine character which are cross-linked to a more or less high extent and which thus, while converving chemical characteristics which are not different from those of linear polyamide-amines of simple structure, are insoluble in water and in biological liquids.

In the cross linked or water insoluble form, the polymers according to the present invention are able to selectively adsorb the heparin present in aqueous solution or in biological liquids such as plasma, blood or the like; surprisingly they are found in this respect to be particularly selective in adsorbing from the biological liquids only the acid polysaccharides or mucopolysaccharides, but not other substances, macromolecular or non-macromolecular, present. They do not have hemolitic properties, do not interfere either with the platelets or other components of the blood, are sufficiently stable in time and their adsorbent capacity is high. For example, in the case of heparin in aqueous solution they can adsorb under suitable conditions a quantity of acid mucopolysaccharide greater in weight than their own weight. They are thus particularly suitable, preferably if in the form of granules from 0.01 to 15 mm diameter, for constructing molecular filters capable of subtracting the heparin or other acid mucopolysaccharides from the material which crosses them; in particular, the use of filters so conceived is a new method for eliminating the heparin present in the blood without modifying its composition, in that extraneous substances are not introduced, nor are other components subtracted, nor are the biological and functional properties of the blood altered in any way.

Practical applications of particular interest of filters so conceived are, for example, 1) the extraction of heparin from the blood conserved with it in containers for chemical, biological use etc., in order to restore totally or partially the coagulability characteristics before infusion; 2) the direct application of said filters in the circuit of extracorporeal circulation apparatus such as the heart-lung apparatus, partial by-passes, extrarenal dialysis apparatus, extracorporeal blood purification apparatus, for reducing the quantity of heparin or other anticoagulants necessarily used in said apparatus; 3) the direct application in an extracorporeal arterial vein or venous vein circuit either with or without a subsidiary pump, for the substraction of heparing of endogenous or exogenous origin. The polymers according to the present invention, if insoluble in water or in biological liquids, alone or in a mixture with other macromolecular substances suitable for constituting constructional materials for biomedical use, become in their turn superficially antithrombogenic after complete saturation with heparin which, as indicated, forms with them complexes which are stable over a long time even at widely variable pH or in phsyiological environments. They are thus particularly convenient for the manufacture of antithrombogenic articles for replacing the systems based on benzalcone chloride, over which they present evident advantages because they are not hemolitic and are much more stable with time and under mechanical stress.

There are thus possible applications of the polymers according to the present invention either alone or in mixture with other substances, in preparing articles such as artificial organs which have to come into contact with the blood, such as pumps and valves for blood circulation, and vascular or cardiac catheters and prosthesis.

With regard to the toxicological aspect, the reactivity of the functional groups is such that aggressive action is not exercised on the cellular membranes.

This has been demonstrated by the fact that from tests conducted with three polymers chosen as examples of polymers having functional groups such as to give them a different overall basicity, they are not toxic to epithelial cell cultures such as the Hela and 37 RC stock even at fairly high concentrations (from 50 to 200 per cc of cultural means). This fact is also confirmed by the absence of hemolysis by the red blood corpuscles which come into contact with the substances concerned, either in the linear or cross linked form. It should be emphasised that the cellular membrane of the red corpuscles is a particularly delicate structure and consequently this requisite may be considered truly indicative of an absence of direct toxicity by the effect of destructive phenomena on the lipoproteic structures of the membrane, these structures constituting the actual base of the cellular vitality.

The tests carried out also exclude the possibility of the existence of important metabolic interferences, in that the two cellular species indicated above have neither been destroyed nor been altered even after long contact with the polymers concerned.

The aforegoing reference to the absence of toxicity in relation to the structure in their morphological and metabolical aspect is valid not only for the molecular examined in their fundamental structure, but also for the aligomers and micromolecules in which these may undergo fission by their degradation.

In practice the acute toxicity of the aforementioned cross linked polymers is practically negligible because samples taken from some examples which were very active as selective agents for capturing heparin give no acute toxicity effects after protracted observations up to one week when injected under the skin into the Swiss Albino mouse in a quantity of 10 g of polymer per kilogram of the body weight of the animal, in the form of suspensions of granules of a diameter from 5–50 $\mu$m. Moreover dogs subjected to extracorporeal circulation experiments with different filters containing from 2 to 10 g of the cross linked polymers according to the invention in the form of granules from 100 to 500 $\mu$g have given no sign of suffering even after 6–10 hours of experiment with the filter inserted in an arterial vein circuit at the femoral level.

EXAMPLE 1

7.76 g of 1,4-bis-acrylylpiperazine, 14 ml of a 1-molar solution of as-N,N-dimethylenediamine and 1.05 g of glycine were placed in a test tube with a ground cap and side cock.

The air was purged from the test tube by introducing a strong current of nitrogen through the side cock, and under the current of nitrogen it is agitated until the mixture is homogeneous, then 6 ml of a 1-molar aqueous solution of ethylenediamine are introduced. It is agitated, the test tube is closed in the nitrogen atmosphere and is left for four days. The product is withdrawn, it is washed with water, it is ground to the desired particle size, it is again washed with acetone, alcohol and ether and is dried under a vacuum of 0.1 mm at 40°C to obtain 10.5 g of a polymer indicated by the initials B2R-73, having the formula

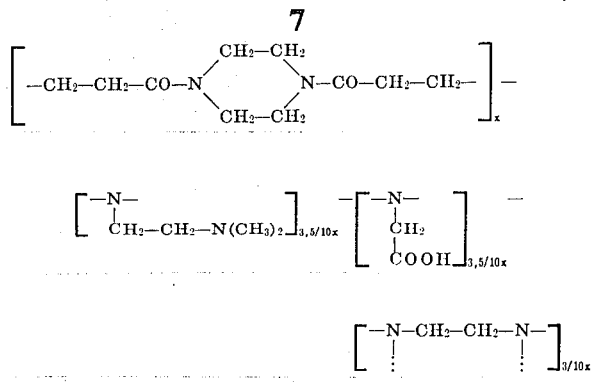

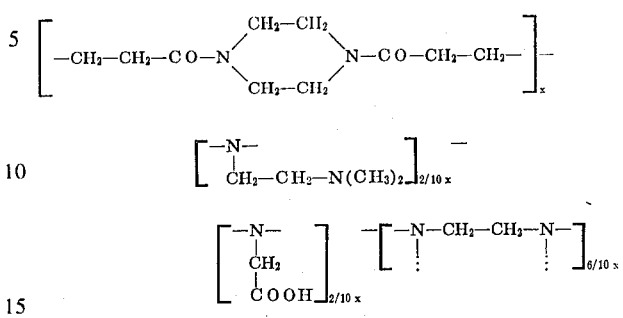

EXAMPLE 2

Operating exactly as described in Example 1, 7.76 g (4 centimoles) of 1,4-bisacrylylpiperazine (obtained from acrylychloride and piperazine in a manner known to the art) and 28 ml of a 1-molar solution of as-N,N-dimethylethylenediamine were placed in a test tube, the mixture then being agitated in a current of nitrogen.

When the solution was complete 6 ml of a 1-molar solution of ethylenediamine were added and the process was continued as indicated in Example 1. 10.6 g of polymer were obtained indicated by the initials B1R-73, of the formula

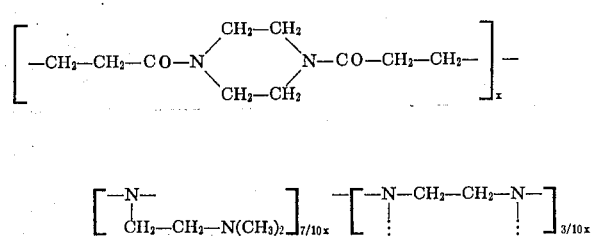

EXAMPLE 3

Example 1 is repeated but replacing the 1.05 g of glycine with 2.436 g of 2,3-trans-piperazinedicarboxylic acid. 11 grams of a product are obtained indicated by B3R-73, of the formula

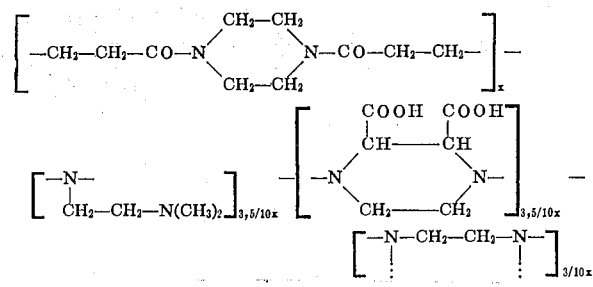

EXAMPLE 4

Example 1 is repeated, but using the same quantity of 1,4-bisacrylilpiperazine 12 ml of a 1-molar solution of as-N,N-dimethylethylenediamine, 0.9 g of glycine and 7 ml of a 1-molar solution of ethylenediamine. A product is obtained with a comparable yield, indicated by B2R-64. Likewise with 7.76 g of 1,4-bisacrylilpiperazine 10 ml of 1-molar as -N,N-dimethylethylenediamine, 0.75 g of glycine and 10 ml of 1-molar ethylenediamine a product is obtained indicated by B2R-55, and with 7.76 g of 1,4-bisacrylilpiperazine, 8 ml of 1-molar as -N,N-dimethylethylenediamine, 0.6 g of glycine and 12 ml of 1-molar ethylenediamine a product is obtained indicated by B2R-46, of the formula

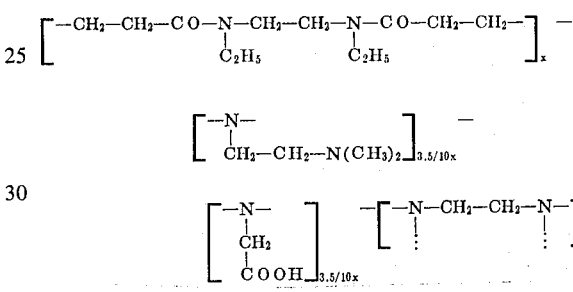

EXAMPLE 5

Example 1 is repeated, replacing the 7.76 g of 1,4-diacrylilpiperazine with 8.96 g of N,N'-diethyl-N,N'-diacrylilethylenediamine and using the same quantities of the other reagents, 11.5 g of a product are obtained indicated by B2FR-73, of the formula

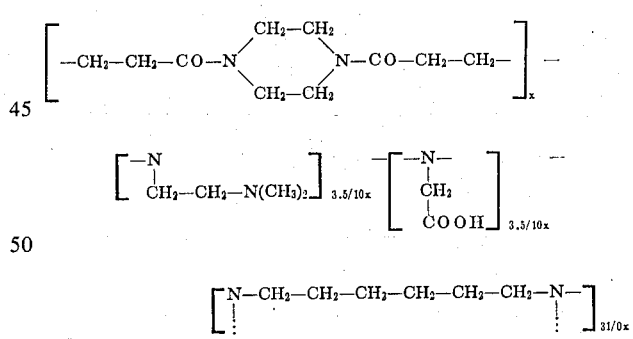

EXAMPLE 6

Example 1 is repeated, replacing the 6 ml of 1-molar aqueous solution of ethylenediamine with 6 ml og a 1-molar aqueous solution of hexamethylenediamine. A product is obtained indicated byB2ER-73, of the formula

EXAMPLE 7

Example 1 is repeated, replacing 14 ml of 1-molar aqueous solution of as-N,N-dimethylethylenediamine with the same quantity of 1-molar aqueous solution of sym-N,N'-dimethylethylenediamine, and using the same quantities of the other reagents. Thus 10.5 g of a product indicated by B4R-73 are obtained, of the formula

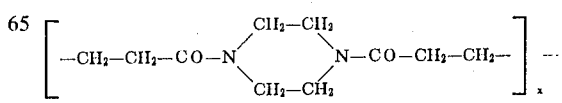

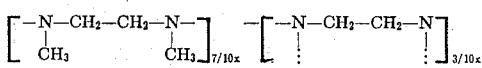

EXAMPLE 8

Operating exactly as in the case of Example 1, 7.76 g of 1,4-bis-acrylylpiperazine are treated with 20 ml of a 2-molar aqueous solution of as-N,N-dimethylethylenediamine and was left alone for three days at ambient temperature. The solution was evaporated then at 40° and 1 mm of Hg, the residue was thoroughly washed with acetone and the tubbery product was dried at 0.1 mm and 40° to obtain 10 g of a linear polymer soluble in water indicated by B1, having an intrinsic viscosity at 30° in ethanol of 0.25 dl/g and a formula

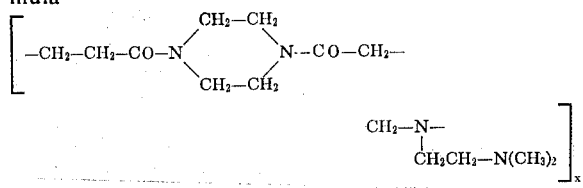

EXAMPLE 9

The previous case was repeated, but using 7.76 g of 1,4-bis-acrylylpiperazine, 20 ml of a 1-molar solution of as-N,N-dimethylethylenediamine and 1.5 g of glycine, to obtain a solid product soluble in water indicated by B2, having an intrinsic viscosity in water at 30° of 0.23 dl/g and the formula

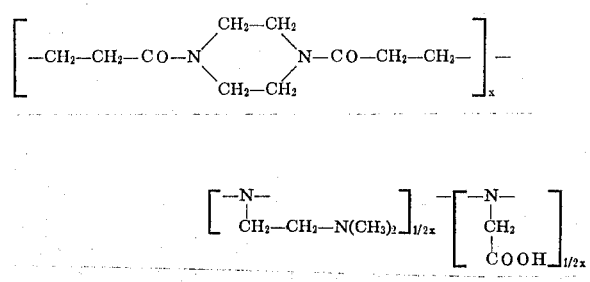

EXAMPLE 10

The previous case was repeated, replacing the 1.5 g of glycine with 3.48 g of trans-2,3-piperazinedicarboxylic acid and using the same quantities of the other reagents.

The product, indicated by B3, had an intrinsic viscosity in water at 30° of 0.35 dl/g, and the formula

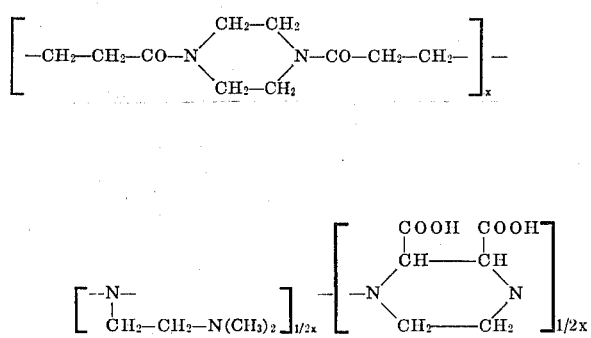

EXAMPLE 10 bis

Operating exactly as described in Example 1, 7.76 g (4 centimoles) of 1,4-bisacrylylpiperazine, 16 ml of a 1-molar solution of as-N,N-dimethylethylenediamine (1.6 centimoles), 1.201 g of glycine (1.6 centimoles) and 8 molar of a 1-molar solution of allylamine (0.8 centimoles) were placed in a test tube, the mixture then being agitated in a nitrogen atmosphere.

After remaining for 24 hours at ambient temperature 11 g of N-vinylpirolidone and 0.150 g of azodiisobutyronitrile were added, agitating in a current of nitrogen. The test tube was then placed in a thermostatic bath at 60°C for a further 24 hours. After this period the product was recovered, was ground, washed at length with water, alcohol and ether, and finally dried at 60° and 0.001 mm Hg, to obtain 18 g of a cross linked polymer called B2R-V1P1

Likewise further cross linked polyamide-amines were prepared by copolymerisation with other vinyl monomers such as acrylonitrile, acrylamide, methylmethacrylate or methylacrylate.

By adding in the second polymerisation stage, together with said vinyl or vinylidene monomers, other bifunctional monomers such as methylenebisacrylamide or still further quantities of 1,4-bisacrylylpiperazine, products are obtained having a higher livel of cross linkage.

The same result is obtained by increasing in the first stage of preparation the relative quantity of allylamine with respect to the other amine monomers.

By adding allylamine in their formulation instead of the ethylenediamine or the other primary diamines, and successively acting as described above, it is possible to obtain polymers similarly cross linked having as the polyamide-amine part that described in relation to all the polyamideamines given in the preceding examples.

EXAMPLE 11

64 mg of B2R-73 polymer having an average granule diameter of 0.2–1 mm are placed in a P.V.C. cylinder having a capacity of 6 ml, 1 cm diameter and 6 cm long, with a perforated disc on its bottom on which a layer of bibulous paper is placed to avoid loss of the polymer. An aqueous solution of 0.025 M $CaCl_2$ buffered with Veronal buffer of pH 7.4 containing 10 μg/ml of heparin is percolated at a speed of 0.5–1 ml/minute. The heparin is dosed downstream of the filter using suitable coagulative tests consisting of coagulating a normal citrated plasma with the addition off $CaCl_2$ (recalcification time) or thrombin (thrombin time), and evaluating the time necessary for the formation of the first filament of fibrin at a temperature of 37°C. The formation time is in relation to the quantity of heprin present. The heparin is hence evaluated by a comparison with the values obtained with known quantities of heparin under the same experimental conditions. It has been found that the polymer is able to capture from 80 to 100 percent of the heparin percolated. The capture takes place even after passage of quantities of heparin equal in weight to the weight of the granules comprising the filter.

EXAMPLE 12

The test Example 11 was repeated, this time passing more concentrated solutions of heparin from $10^2$ µg/ml, to $10^4$µg/ml.

It was found that capture takes place in a similar manner to the previous case with capture not less than 80 percent, and that the filter becomes incapable of capturing heparin only after passage of a quantity of heparin equal in weight to the quantity by weight of the synthetc polymer B2R-73. The experiment took place at ambient temperature and at 37°C without observing any modification of the heparin adsorbing capacity of the cross linked polymer due to temperature.

EXAMPLE 13

64 mg of B2R-73 polymer prepared as in Example 1 are reduced to very fine granules by grinding in the liquid phase with a Teflon rotating pestle in a glass container (known as a Potter homogeniser).

The process was then carried out as indicated in Example 1, but with the filtration carried out under vacuum by means of a water pump (20 mm/hg) to aid the passage of the anticoagulant solution through the filter. In this case the heparin absorbent capacity is always about 100 percent and is maintained even after passage of quantities of heparin approximately equal in weight both at ambient temperature and at 37°C.

EXAMPLE 14

Example 13 was repared but with the passage of more concentrated solutions of heparin from $10^2$ µug/cc to $10^4$ µg/cc.

The heparin absorbent capacity is equal to that described in Example 13.

EXAMPLE 15

Examples 11–13 are repated but using anticoagulants belonging to semisynthetic acid polysaccharides different to heparin (dextran sulphonate BDH, P.M. 500,000). The results are similar to those obtained in the case of heparin solutions.

EXAMPLE 16

The polymers of the examples 2 to 7 were subjected to tests analogous to those given in examples 11–15 and it was found that for the same conditions, the results are practically identical to those already found for the polymer B2R-73.

EXAMPLE 17

The tests of Examples 11–15 were repeated, both with the polymer of Example 1 and with the polymers of Examples 2 to 7, but using solutions of heparin in human plasma instead of in water, it was found that the capacity of the filters constituted as indicated above for capturing heparin from solutions in plasma is practically identical to their capacity for capturing heparin from aqueous solutions.

EXAMPLE 18

Example 17 is repeated but passing pure human plasma in the filters, and comparing the coagulative capacity of the plasma before and after passage over said filters. No alteration in the coagulative capacity of the plasma was noticeable in practice after passage over the filters.

EXAMPLE 19

A cylindrical container of P.V.C. of approximately 20 cc (10 cm long) is filled with 4 g of B2R-64 granules (particle size 0.1–1 mm). The granules are retained in the container by a suitable mesh in the form of a glove finger inserted in the P.V.C. tube. This filter is connected by a phleboclysis tube to a bottle containing 500 cc of citrated human blood. The blood is made to percolate by gravity through the filter. The plasma is separated from the filtered blood by centrifuging.

The following are carried out on the plasma: A) dosing the fibrinogen, B) some coagulative tests known in clinical practice for identifying any defects in the coagulation factors, namely:

P.T. = prothrombin time
P.T.T. = partial thromboplastin time
T.T. = thrombin time counting the platelets.
C. spectrophotometric dosing of the hemoglobin.

The results obtained show that there is not alteration in the plasma content of the fibrinogen in terms of the number of platelets nor of the other twelve factors which intervene in the coagulation process. The zero values of hemoglobin signify that the filter does not cause hemolysis in the blood.

EXAMPLE 20

400 mg of the polymers B2R-73, B3R-73 and B1R-73 having an approximate particle size of 0.1–1 mm in diameter, are placed in a container constituting a filter in accordance with Example 11 and over this are percolated 4 ml of serum. Proteins were dosed in the filtered serum and the quantitative and qualitative composition was defined; this composition was determined by electrophoretic separation of the various serum proteins. It was found that no fraction of the proteins of the serum ($\alpha_1$, $\alpha_2$, $\beta$ ambumins and $\gamma$ globulins) was substracted by passage over the filters. In other words the filtration of the blood does not substract the macromolecular protein substances normally present in the serum.

EXAMPLE 21

Example 20 was repeated. In this case a suspension of human red corpuscles in a physiological solution was percolated over the filter. In the filtrate the number of red corpuscles was determined per units of volume by counting in a Burke chamber. A comparison with the numbers in the initial suspension shows that there is no change in the number of red corpuscles after filtration. From the same filtrate the corpusculate part was separated by centrifuging and the hemoglobin content in the floating part was evaluated by spectrophotometry. The values observed were zero and this demonstrates that the filter does not give rise to any hemolitic phenomenon in relation to the red corpuscles.

EXAMPLE 22

The entire blood was made to percolate through the filter in a system entirely identical to that described in Example 19. In this case the citrated blood was previously dosed with heparin in a quantity of 10 µg of heparin per ml of blood. The blood was made to percolate by gravity through the filter at a flow rate of 2 ml/min. and 4 ml/min. The samples of filtered blood were collected and the plasma separated by centrifuging. A determination was then made of the residual heparin content in the plasma by evaluating the thrombin time of the various plasmatic fractions and a relative comparison with the rhombin times obtained with the same control plasma dosed with known quantities of heparin.

It was established that the filter is capable of capturing 98–100 percent of the heparin dissolved in the plasma. The capture capacity depends on the quantity and particle size of the cross linked polymer, and the time of contact of the blood with the filter granules.

EXAMPLE 23

Granulated B2R-64 (particle size 0.1–1 mm) was expanded in a physiological solution buffered with sodium veronal of pH 7.4 (physiological pH). Two samples of the same granulate equal to a volume of 1 ml were incubated with 5 ml of an aqueous solution (10 mg/ml) of heparin. A sample was incubated at 37°C. The second sample was at ambient temperature. It was found that capture was of the same level at ambient temperature and at 37°C.

EXAMPLE 24

Blood samples were withdrawn from a dog in order to establish the basic coagulative parameters. The animal was narcotized by an intravenous injection of Nembutal (25 mg/kg) and immediately afterwards 3 mg/kg of heparin were injected into the circulating blood of the animal. After eight minutes another sample of venous blood was withdrawn in order to determine the extent of the reduction in the coagulative capacity produced by the drug.

The artery and femoral vein of the animal were then isolated and suitably prepared surgically. They were then incannulated and connected to an extracorporeal circuit constituted as follows: the arteria cannula was connected to a tube A of silastic of 3 mm diameter and a length of 40 cm. The other end of this tube was connected to the inlet of a filter consisting essentially of a cylindrical container with two apertures at its ends, having a capacity of 30 cm$^3$ and walls of non-toxic P.V.C., containing approximately 2 g of granulate B2R-64, retained by a mesh of plastics material of the type used in transfusion filters. The outlet end of the filter was connected to a second tube C of the same characteristics as the first described tube. The distal end of said tube was connected to the venous cannula which refeeds the blood into the dog, and a rotating De Bakey pump was connected in the tube to enable the blood to flow at a controllable flow rate.

Both in the tube A and in the tube B, three way connectors of silicone plastics material were inserted in order to aid the collection of blood samples during the experiment.

Evaluating the overall results by comparison with the checks made both before and after on the same animal and verifying data obtained from literature, it can be concluded that by the passage and recirculation of blood through the system described, an accceleration is obtained in the return of the normal coagulative capacity of the blood, conditioned by capture by the filter of part of the heparin.

Said capture, for equal heparin concentrations in the blood and equal weights of polymer material used in the filter, is a function of the following parameters:
1. circulating mass of the animal,
2. dimensions of the filter, or more precisely the extent of the contact surface between the polymer and blood, or more precisely in the system used by us the particle size characteristics of the material,
3. time of contact between blood and polymer in relation to the flow rate imposed by the pump, and hence the speed of passage through the filter.

The importance of said parameters can be evaluated fully by studying samples of blood withdrawn simultaneously during the experiment upstream and downstream of the filter.

EXAMPLE 25

Example 24 was repeated, using instead of the granulate B2R-64 one of the following granulates as the material constituting the filter: B1R-73, B3R-73, B2R-73, B2R-55, B2R-46, B4R-73, B2FR-73 or B2ER-73, the preparation of which was described in Examples 2–7.

The results are pratically identical.

EXAMPLE 26

This and the following examples relate to the removal of heparin by a molecular filter inserted in the outlet line of an extracorporeal circuit in which the addition of heparin to the blood is carried out "regionally," i.e., by introducing heparin continuously in a controlled manner into the inlet line of the apparatus (i.e., where the blood enters the apparatus).

An animal (dog) is used of medium size, rendered uraemic by binephrectomy carried out three days before the experiment. An apparatus for extracorporeal blood dialysis of the Kiil type is applied, connecting the circuit between the femoral artery and vein. Heparin is injected into the inlet line to the apparatus by chronoinfusion in a quantity of 20 drops/minute of a solution of 150 mg in 500 cc for an extracorporeal circuit having a flow rate of 200 cc/minute.

By this method the blood can flow through the circuit without coagulative phenomena taking place in it. By withdrawing blood along the circuit, it can be checked that the time for coagulation is sufficiently long.

A filter amide with a polymer of type B2R64 is inserted in the outlet line of the apparatus, preceded or followed by an auxiliary De Bakey pump. With this arrangement it is possible to carry out removal of heparin with the return of the basic coagulative values.

This can be chacked by withdrawals of blood repeated downstream of the molecular filter. It is equally possible if desired to obtain a partial removal of heparin a) by increasing the circulation rate (i.e., the pump speed); b) by inserting the filter in parallel in the exit line of the apparatus; c) by reducing the quantity of molecularly active material in the filter or its dimensions.

The previous examples will have sufficiently clarified the characteristics and significance of the present invention in its various aspects. It should however be noted that the products according to the invention may also be used in other physical forms and in particular in accordance with the following possibilities:

1. The contact between the biological liquid containing the polyanions and the capturing or complexing agent of the invention is made by means of an apparatus in which the poly(amide-amines) form a thin film of large surface area, supported by a convenient support material, and the biological liquid is made to run over the surface of said film.

2. The contact is established between the biological liquid and a filter in which the complexing agent according to the invention is present in the form of solid granules consisting of poly(amide-amines) mixed with a chemically inert polymer in relation to the biological liquid itself, hence consistuting both a physical support and a solid diluent for the poly(amide-amine).

3. The contact is obtained by passing the biological liquid through one or more tubular elements whose internal walls are formed from an active poly(amide-amine) according to the present invention.

It is however evident that further numerous modifications and variations, mechanically and conceptually rquivalent are possible and these possibilities are to be considered as lying within the scope of the present invention.

EXAMPLE 27

A lattice of cellulose thread with meshes of 2 cm × 1 cm and a thread diameter of 0.5 mm is soaked with an aqueous solution of the mixture of monomers which when polymerised as described in example 6 (c) give B2R-64, and is then suspended in an enclosed chamber the atmosphere of which is kept saturated with humidity so as to prevent evaporation of the solution in which the thread is soaked. The polymerisation thus takes place on the thread which, when the reaction has finished, is intimately covered with B2R-64 polymer.

This lattice filter has been tested under conditions similar to those of the previous filters, and in addition to its specific function as a heparin remover, an interesting antithrombogenic surface effect after complete saturation with heparin has been found.

What we claim is:

1. A method of treating blood to firmly complex, neturalize and thereby eliminate heparin occurring therein, comprising adjusting the blood to a pH between 3 and 10, contacting said pH adjusted blood for a tme ranging from about 1 to 600 seconds with a polymer comprising monomeric units derived from:

A. the group consisting of bis-acryl-piperazines and aliphatic bis acryl amides of the formula

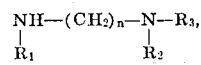

wherein
   $n = 1$ to 6 and $R_1$, $R_2$ being the same or different, are either H or alkyl of 1 to 6 carbon atoms; and at least B. the group consisting of primary or secondary diamines of the formula

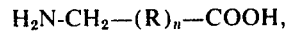

wherein
   $n = 1$ to 6 and $R_1$, $R_2$ and $R_3$ are selected from the group consisting of H and alkyl with 1–6 carbon atoms, provided that only one of them is hydrogen and when $R_1 = CH_3$, $R_2$ is different from $CH_3$;

with possible further monomeric units derived from:
   C. the group consisting of piperazine mono- and dicarboxylic acids and aliphatic amino-acids of the formula

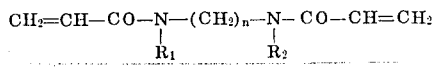

where $n$ may be 0 or 1 and R is a linear or branched aliphatic radical containing 1 to 6 carbon atoms;
   D. the group consisting of allyl-amine and aliphatic, saturated amino compounds containing from 2 to 12 carbon atoms and two primary amine groups; or
   E. the group consisting of vinyl-pyrrolidone, N-acrylyl-morpholine and acryl-amide.

2. A method according to claim 1, wherein the polymer is soluble in blood and comprises at least one monomeric unit derived from each of the groups A and B.

3. A method according to claim 1, wherein the polymer is soluble in blood and comprises at least one monomeric unit derived from each of the groups A, B and C.

4. A method according to claim 1, wherein the polymer is a regular addition copolymer of 1,4-bis-acrylyl piperazine, N,N-dimethylene diamine, glycine, allyl-amine and N-vinyl pyrrolidone.

5. A method according to claim 1, wherein the polymer is cross-linked and insoluble in blood and comprises at least one monomeric unit derived from each of the groups A, B and C.

6. A method according to claim 1, wherein the polymer is cross-linked and insoluble in blood and comprises at least one monomeric unit derived from each of the groups A, B, C and D.

7. A method according to claim 1, wherein the polymer is cross-linked and insoluble in blood and comprises at least one monomeric unit derived from each of the groups A, B, C, D and E.

8. A method according to claim 5, wherein the polymer is in the form of solid granules.

9. A method according to claim 6, wherein the polymer is in the form of solid granules.

10. A method according to claim 7, wherein the polymer is in the form of solid granules.

* * * * *